United States Patent

Meyer

[15] 3,646,803
[45] Mar. 7, 1972

[54] PARAMAGNETIC GAS-MEASURING DEVICE

[72] Inventor: Emilio G. Meyer, Milan, Italy

[73] Assignee: Mine Safety Appliances Italiana, S.p.A., Milan, Italy

[22] Filed: Mar. 6, 1970

[21] Appl. No.: 17,146

[30] Foreign Application Priority Data

Dec. 1, 1969    Italy..................................25193 A/69

[52] U.S. Cl. .......................................................73/27 A
[51] Int. Cl. ..................................................G01n 27/18
[58] Field of Search................73/27 A, 194 EM, 194 M, 23; 324/36

[56] References Cited

UNITED STATES PATENTS

| | | | |
|---|---|---|---|
| 2,903,883 | 9/1959 | Luft | 73/27 A |
| 3,292,421 | 12/1966 | Meyer | 73/27 A |
| 3,045,474 | 7/1962 | Ebbinshaw | 73/27 A |

OTHER PUBLICATIONS

Dyer " A Paramag. Oxygen Analyzer" Review of Scientific Inst. Vol. 18 No. 10 pp. 696–697.

Primary Examiner—Charles A. Ruehl
Assistant Examiner—Ellis J. Koch
Attorney—Brown, Murray, Flick & Peckham

[57] ABSTRACT

The ends of a hollow cylindrical magnet are closed by closures, from which pole pieces extend toward each other with their inner ends spaced apart to form an airgap. The device is provided with an inlet and an outlet for a gaseous mixture that may contain a paramagnetic gas, such as oxygen or nitricoxide. Four electrical resistance heating elements are spaced along a substantially diametric line extending through the gap, with a pair of the elements disposed at each side of the gap. Wires lead from each element out of the magnet for connecting them in an electric circuit to heat them and the surrounding gaseous mixture. This heating, when a paramagnetic gas is present, creates a magnetic wind that moves the gaseous mixture into the gap between the two pairs of heating elements and out of it across them for removing heat from the two innermost elements and transferring it to the outermost elements. The difference in temperature between the inner and outer elements is a measure of the concentration of the paramagnetic gas in the mixture.

9 Claims, 5 Drawing Figures

PATENTED MAR 7 1972

INVENTOR.
EMILIO G. MEYER
BY
Brown, Murray, Flick & Peckham
ATTORNEYS.

PARAMAGNETIC GAS-MEASURING DEVICE

Paramagnetic gas sensors are well known, as is also the magnetic wind that is produced in them when a paramagnetic gas is heated. In such sensors the difference in temperature between certain heating elements, caused by the magnetic wind, is measured and discloses the presence and the concentration of a paramagnetic gas in the sample gas.

It is among the objects of this invention to provide such a measuring device which is smaller, less expensive and simpler in construction than those known heretofore.

The preferred embodiment of the invention is illustrated in the accompanying drawings, in which FIG. 1 is an end view of the device;

Figure 1:
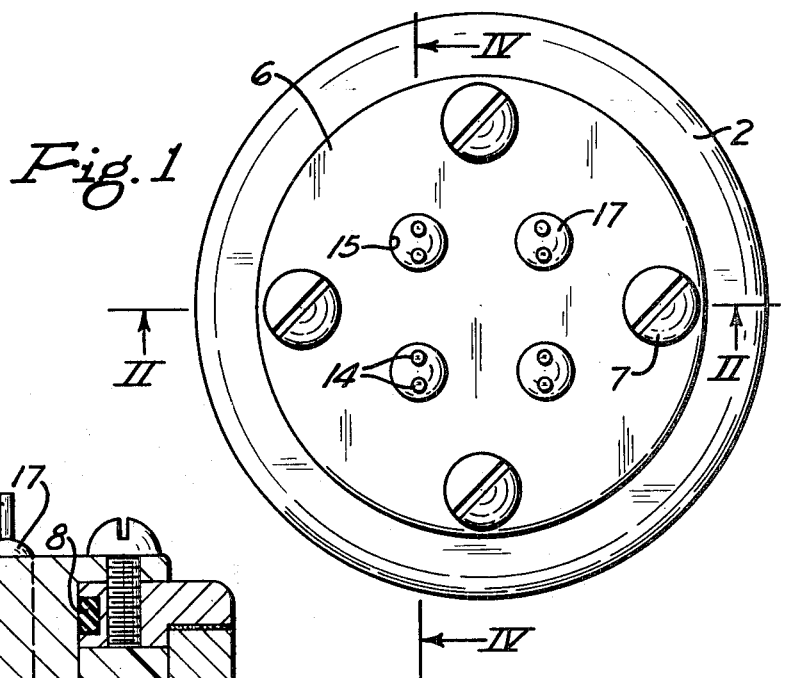
Figure 2:
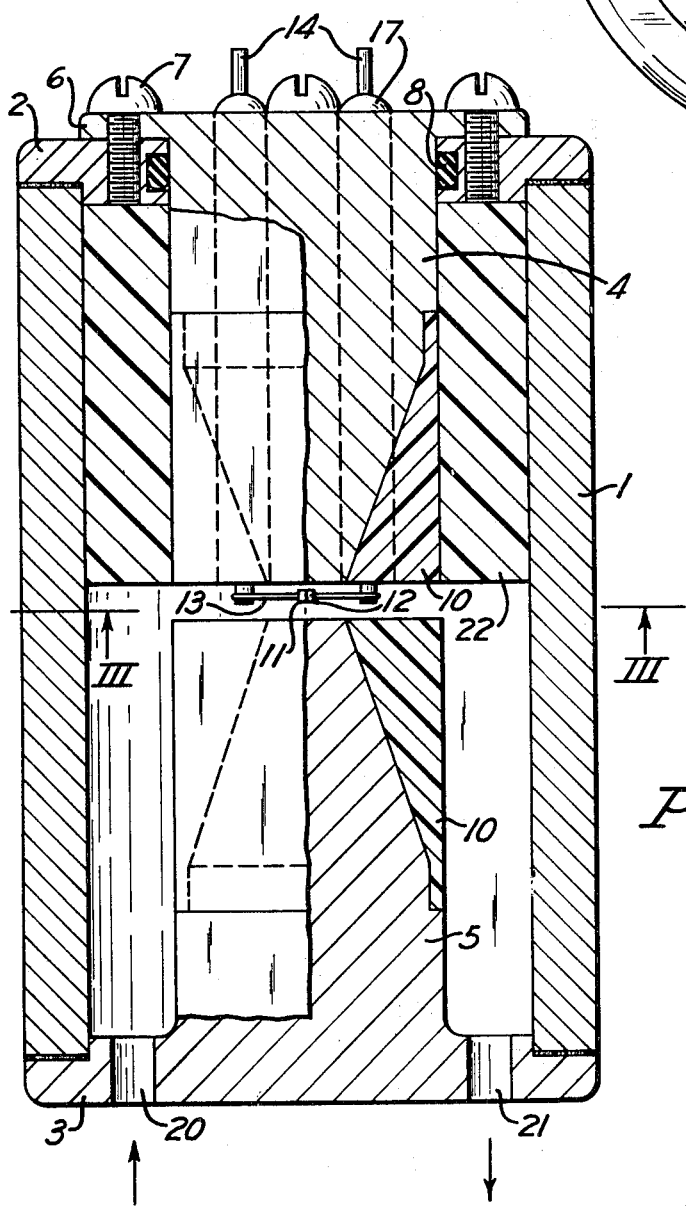
FIG. 2 is an enlarged longitudinal section taken on the line II—II of FIG. 1.

Referring to the drawings, the main body of the device is formed from a hollow cylindrical magnet 1 a few inches long, to the ends of which are cemented a pair of closures 2 and 3. The closures are made of soft iron or the equivalent. Extending centrally from said closures toward each other are round pole pieces 4 and 5, the inner ends of which are spaced apart to form an air gap between them. The pole pieces are spaced inwardly from the encircling wall of the magnet and, for best results, their inner portions are tapered toward each other. They are made of soft iron or the equivalent. The outer end of pole piece 5 may be integral with the adjoining closure, but the other pole piece preferably extends through a circular opening in the closure 2 and is provided at its outer end with a flange 6 that engages the outer surface of that closure. The flange is held in place by screws 7. The wall of the closure opening may be provided with an annular groove in which a sealing ring 8 is mounted that tightly engages the encircled pole piece.

Figure 3:
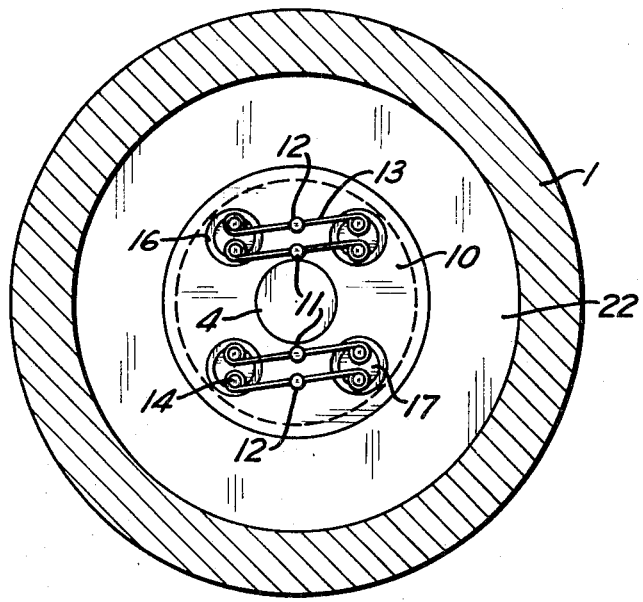
FIG. 3 is a cross section taken on the line III—III of FIG. 2.
Figure 4:
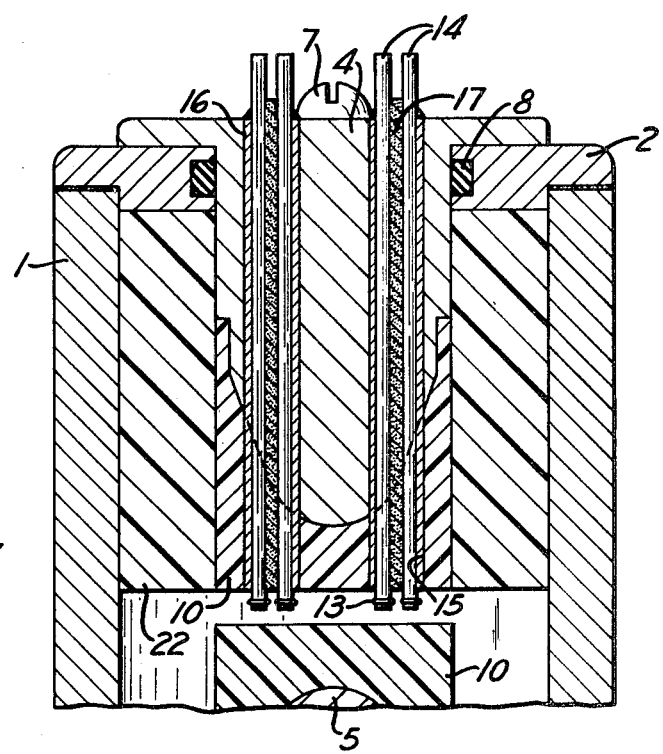
FIG. 4 is a fragmentary longitudinal section taken on the line IV—IV of FIG. 1.

The tapered portion of each pole piece is encircled by a nonmagnetic sleeve 10 that has a cylindrical outer surface, preferably flush with the cylindrical portion of the pole piece. The inside of the sleeves is tapered to fit the pole pieces. Between the ends of the two sleeves there are four electrical resistance-heating elements 11 and 12, as shown in FIG. 3, spaced along a line that extends substantially diametrically across the hollow magnet about midway between the pole pieces. A pair of the heating elements are disposed at each side of the gap between pole pieces, but between the thick inner end of sleeves 10. The heating elements can be supported in various ways, but preferably by means of their terminal wires 13, which are secured to the inner ends of heavier stiff wires 14 extending out of the hollow magnet. To accommodate and hold the stiff wires, it is desirable to provide the removable pole piece 4 with a plurality of longitudinal passages 15 (FIG. 4), preferably four in number, spaced uniformly around the axis of the pole piece. The eight stiff wires extend in pairs through these openings. For supporting the wires and sealing the passages, insulating sleeves 16 containing the wires may be fitted in the passages and filled with suitable potting material 17. The wires are so positioned in the tubes that the terminal wires of all of the heating elements will be disposed in parallel relating when connected to the projecting inner ends of the stiff wires. The heating elements include a ceramic coating to avoid any catalytic effect.

This device is provided in suitable locations with an inlet and an outlet for the gaseous mixture that is to be analyzed. Preferably, the inlet 20 and outlet 21 are in closure 5. It is desirable to reduce the size of the chamber within the magnet and the flush-out time, so a ring 22 of nonmagnetic material may encircle the removable pole piece and its sleeve to fill the space between them and the encircling magnet.

Figure 5:
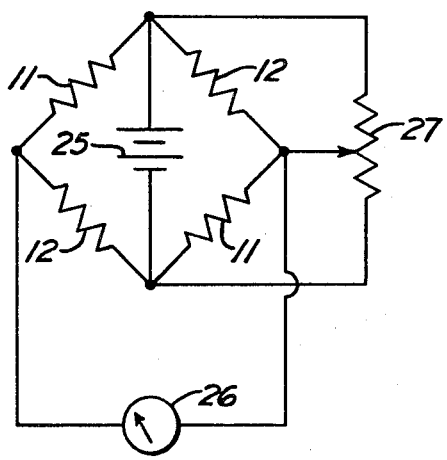
FIG. 5 is an electric circuit diagram.

In operation, the outer ends of the stiff wires are connected in an electric circuit in such a manner as to form a Wheatstone bridge as shown in FIG. 5. The two inner heating elements 11 are in two opposing arms of the bridge circuit, while the outer elements 12 are in the other two arms. A battery 25 in the circuit heats the elements to a high temperature. A meter 26 also connected in the circuit is adjusted to zero by means of potentiometer 27, when there is no paramagnetic gas in the analyzing device. The gaseous mixture to be analyzed is fed through a tube to the inlet of the device very slowly, such as about ½ cu. ft. an hour. The meter does not register as long as there is no paramagnetic gas in the mixture, but if such a gas should be present it will be heated adjacent the gap by the heating elements and its magnetic susceptibility will be reduced, whereby a magnetic wind will be created because the adjoining cool gas will be magnetically attracted into the gap and will displace the warm gas. The magnetic wind moves the gaseous mixture into the gap from opposite directions through paths that lead into the gap between the two pairs of heating elements. The wind carries the mixture out of the gap in opposite directions across the heating elements and will thereby remove heat from the two innermost elements and transfer or carry it to the two outermost elements. The rate of flow will be proportional to the concentration of the paramagnetic gas in the gaseous mixture within the chamber. The cooling of the inner heating elements and the superheating of the outer ones will unbalance the bridge circuit. The difference in temperatures will be proportional to the amount of gas flow and therefore to the concentration of the paramagnetic gas causing that flow, and this will be indicated by the meter.

Although this invention has been described as if there were only one line of heating elements, it will be understood that if desired there can be other similar lines of such elements on different diameters of the magnet passing through the gap.

The sleeves 10 on the tapered pole pieces provide larger inner end surfaces on which to mount the heating elements. Without the sleeves, the heat dissipation of the inner elements 11 would be higher than the heat dissipation of the outer elements 12.

Because of the small heating elements used, the entire device can be made very small and portable. Also, the temperature of the heaters can be very high compared with those used in oxygen sensors heretofore. This high temperature and the small size of the heating elements will create a very sharp temperature gradient that greatly enhances the efficiency of the sensor. The high temperature of the elements also makes the device less dependent upon ambient temperature changes, since such changes are relatively small compared with the temperature of the heating elements.

With the small heating elements, the electric power dissipated inside of the device is so small that its temperature is not greatly affected by that power. This frees the device from warmup time and makes it suitable for operation by battery as a portable indicator.

I claim:

1. A device for use in measuring the concentration of a paramagnetic gas in a gaseous mixture, comprising a hollow cylindrical magnet, closures secured to the ends of the magnet, pole pieces extending centrally from said closures toward each other with their inner ends spaced apart to form a gap, the pole pieces being spaced inwardly from the encircling wall of the magnet, said device being provided with an inlet and an outlet to the annular space between the pole pieces and the cylindrical magnet for the gaseous mixture being analyzed, four electrical-resistance-heating elements spaced along a substantially diametric line extending through said gap, a pair of said elements being disposed at each side of the gap, and wires leading from each heating element out of the magnet for connecting the elements in an electric circuit to heat them and thereby the gaseous mixture, whereby to create in the presence of a paramagnetic gas a magnetic wind moving some of the gaseous mixture into said gap between the two pairs of heating elements and out of the gap across those elements for removing heat from the two innermost elements and transferring it to the two outermost elements, said device being adapted to be electrically connected to means for measuring the difference in temperature between said innermost heating elements and said outermost heating elements.

2. A device according to claim 1, in which said wires support the heating elements and extend out through one of said closures, and said inlet and outlet are located in the other closure.

3. A device according to claim 1, in which one of said pole pieces is provided with a plurality of longitudinal passages there through receiving said wires, said device including insulating members mounted in said passages and sealing the wires therein.

4. A device according to claim 1, in which one of said closures is provided with a central opening in which the outer end of one of the pole pieces fits, and said outer end of the pole piece is provided with a flange secured to the outer surface of said one closure.

5. A device according to claim 1, including nonmagnetic means encircling one of the pole pieces and filling the space between it and the surrounding magnet.

6. A device according to claim 5, in which said means include an internally tapered cylindrical sleeve fitting around the pole piece, and a ring encircling the sleeve.

7. A device according to claim 1, in which said pole pieces are tapered toward each other, said device including an internally tapered nonmagnetic sleeve fitting around each pole piece and having a cylindrical outer surface, insulating tubes surrounding said wires, and means sealing the wires in the tubes, one of said pole pieces and the sleeve surrounding it being provided with longitudinal passages containing said tubes.

8. A device according to claim 1, including means for measuring the difference in temperature between the inner heating elements and the outer ones when a paramagnetic gas is present.

9. A device according to claim 1, in which said heating elements have terminal wires and are supported by them out of contact with the rest of said device.

* * * * *